United States Patent
Villiger

(10) Patent No.: US 10,613,287 B1
(45) Date of Patent: Apr. 7, 2020

(54) METHODS FOR FORMING FIBER OPTIC CABLES AND FIBER OPTIC CABLES HAVING HELICAL BUFFER TUBES

(71) Applicant: AFL Telecommunications LLC, Duncan, SC (US)

(72) Inventor: Brett Villiger, Simpsonville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 16/196,584

(22) Filed: Nov. 20, 2018

(51) Int. Cl.
*G02B 6/44* (2006.01)

(52) U.S. Cl.
CPC ......... *G02B 6/4479* (2013.01); *G02B 6/4434* (2013.01)

(58) Field of Classification Search
CPC ..... G02B 6/449; G02B 6/4413; G02B 6/4491
See application file for complete search history.

(56) References Cited

U.S. PATENT DOCUMENTS

| | | | | |
|---|---|---|---|---|
| 5,310,510 A * | 5/1994 | Pascher | ................. | G02B 6/4408 264/1.28 |
| 5,826,419 A * | 10/1998 | Shelander | ............ | G02B 6/4479 57/6 |
| 6,185,351 B1 * | 2/2001 | Daneshvar | ........... | G02B 6/4432 385/114 |
| 6,249,629 B1 * | 6/2001 | Bringuier | ............. | G02B 6/4433 385/101 |
| 6,674,946 B2 * | 1/2004 | Warden | ................. | G02B 6/4432 385/104 |
| 8,175,434 B2 * | 5/2012 | Davidson | ............. | G02B 6/4413 385/113 |
| 8,805,144 B1 * | 8/2014 | McAlpine | ............ | G02B 6/4433 385/113 |
| 8,913,862 B1 * | 12/2014 | Emmerich | ........... | G02B 6/4429 385/103 |
| 9,075,212 B2 * | 7/2015 | McAlpine | ............ | G02B 6/4413 |
| 9,323,019 B1 * | 4/2016 | Goddard | .............. | G02B 6/4434 |
| 9,523,832 B2 * | 12/2016 | Stratton | ............... | G02B 6/4416 |
| 10,031,303 B1 * | 7/2018 | McNutt | ................ | G02B 6/4433 |
| 10,120,152 B1 * | 11/2018 | Evans | ................... | G02B 6/4434 |
| 10,261,278 B1 * | 4/2019 | Murthy | ................. | G02B 6/4415 |
| 2002/0003935 A1 * | 1/2002 | Warden | ................ | G02B 6/4432 385/104 |
| 2003/0059182 A1 * | 3/2003 | Johnson | ............... | G02B 6/4403 385/112 |
| 2003/0068145 A1 * | 4/2003 | Nechitailo | ........... | G02B 6/4434 385/103 |

(Continued)

*Primary Examiner* — Rhonda S Peace
(74) *Attorney, Agent, or Firm* — Dority & Manning, P.A.

(57) ABSTRACT

A method for forming a fiber optic cable includes paying off a buffer tube such that the buffer tube extends generally along a longitudinal axis. The method further includes binding the buffer tube with a strength member. The strength member has at least one of a tension or a stiffness that is greater than a respective tension or stiffness of the buffer tube. The resulting fiber optic cable includes the strength member extending along a longitudinal axis and the buffer tube wrapping helically about the strength member. A fiber optic cable includes a strength member extending generally along a longitudinal axis. The fiber optic cable further includes a buffer tube wrapping helically about the strength member. The strength member has at least one of a tension or a stiffness that is greater than a respective tension or stiffness of the buffer tube.

12 Claims, 1 Drawing Sheet

(56) References Cited

U.S. PATENT DOCUMENTS

| | | | |
|---|---|---|---|
| 2006/0072886 A1* | 4/2006 | Kim | G02B 6/441 |
| | | | 385/115 |
| 2010/0008631 A1* | 1/2010 | Herbst | H01B 7/046 |
| | | | 385/101 |
| 2011/0194825 A1* | 8/2011 | Parris | G02B 6/4486 |
| | | | 385/109 |
| 2015/0370023 A1* | 12/2015 | Baca | G02B 6/441 |
| | | | 385/110 |
| 2018/0088294 A1* | 3/2018 | Testu | D07B 3/005 |

\* cited by examiner

METHODS FOR FORMING FIBER OPTIC CABLES AND FIBER OPTIC CABLES HAVING HELICAL BUFFER TUBES

FIELD

The present disclosure relates generally to methods for forming fiber optic cables, as well as fiber optic cables, having helical buffer tubes.

BACKGROUND

Optical fiber is increasingly being used for a variety of applications, including broadband applications such as voice, video and data transmissions. As a result of this increasing demand, fiber optic networks typically include a large number of mid-span access locations at which one or more optical fibers are branched from a distribution cable. These mid-span access locations provide a branch point from the distribution cable and may lead to an end user, commonly referred to as a subscriber. Fiber optic networks which provide such access are commonly referred to as FTTX "fiber to the X" networks, with X indicating a delivery point such as a premises (i.e. FTTP).

Various cable types and sizes are utilized throughout the network. However, recently, demand has increased for fiber optic cables which can span longer distances, such as greater than 350 feet, while still meeting certain design requirements. For example, demand has increased for long-span fiber optic cables which are all-dielectric and have low sag, and which have reduced optical and mechanical issue potential, while remaining at relatively low costs and with relatively small diameters.

Accordingly, improved fiber optic cable designs and methods for forming such fiber optic cables are desired in the art. In particular, improved cable designs and forming methods which facilitate use over relatively long spans while meeting other design requirements would be advantageous.

BRIEF DESCRIPTION

Aspects and advantages of the invention will be set forth in part in the following description, or may be obvious from the description, or may be learned through practice of the invention.

In accordance with some embodiments, a method for forming a fiber optic cable is provided. The method includes paying off a buffer tube such that the buffer tube extends generally along a longitudinal axis. The method further includes binding the buffer tube with a strength member. The strength member has at least one of a tension or a stiffness that is greater than a respective tension or stiffness of the buffer tube. The resulting fiber optic cable includes the strength member extending along a longitudinal axis and the buffer tube wrapping helically about the strength member.

In accordance with other embodiments, a fiber optic cable is provided. The fiber optic cable includes a strength member extending generally along a longitudinal axis. The fiber optic cable further includes a buffer tube wrapping helically about the strength member. The strength member has at least one of a tension or a stiffness that is greater than a respective tension or stiffness of the buffer tube.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
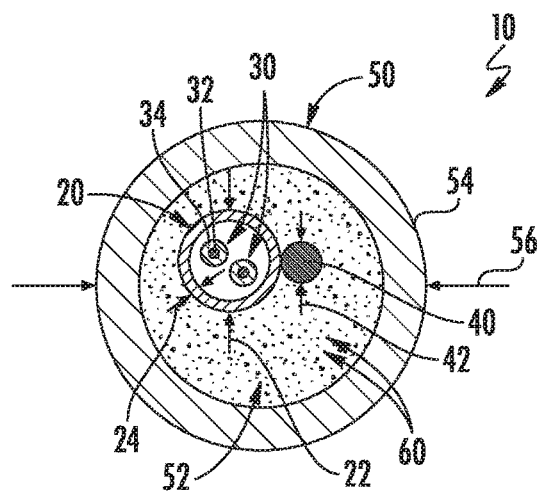
FIG. 1 is a cross-sectional profile view of a fiber optic cable in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction.

Figure 2:
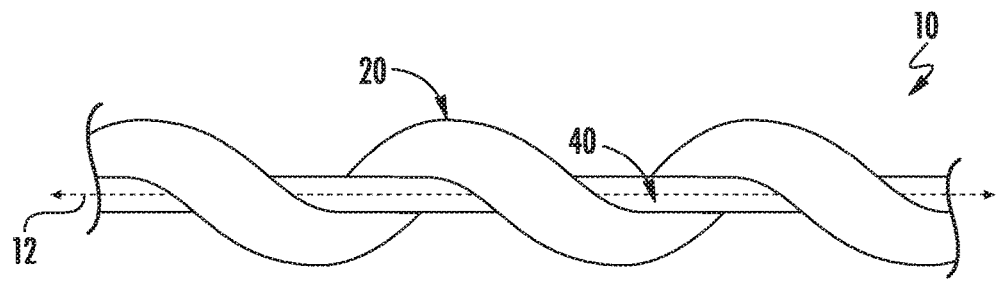
FIG. 2 is a side view of a buffer tube bound with a strength member in accordance with embodiments of the present disclosure.

Referring now to FIGS. 1 and 2, the present disclosure relates generally to improved fiber optic cables 10. Fiber optic cables 10 in accordance with the present disclosure can advantageously be utilized over relatively long spans, such as greater than 150 feet, greater than 250 feet, greater than 350 feet, and/or greater that or equal to 400 feet. In particular, such cables 10 can extend through such distances with less than one foot loaded sag, or less than 5% loaded sag, or less than 4% loaded sag, or less than 3% loaded sag. Loaded sag is calculated in accordance with NESC Heavy design criteria. Further, such cables 10 may advantageously be all-dielectric, have relatively small outer diameters, and advantageously be manufactured and deployed at relatively low costs.

Cables 10 in accordance with the present disclosure may further be capable of accommodating tensile loads of greater than 1000 pounds, such as greater than 1050 pounds, such as greater than or equal to 1100 pounds.

Cables 10 in accordance with the present disclosure may further be capable of accommodating cable strain of greater than 1.0%, such as greater than 1.05%, such as greater than or equal to 1.1%.

As shown, a cable 10 in accordance with the present disclosure may include a buffer tube 20. The buffer tube 20 may, in exemplary embodiments, surround and be in contact with one or more optical fibers 30. Buffer tube 20 may be formed from a suitable polymer material, such as a suitable thermoplastic. For example, buffer tube 20 may be formed from a polyester, such as in some embodiments, a polybutylene terephthalate. In some embodiments, buffer tube 20 may be formed from a polypropylene.

In some embodiments, buffer tube 20 may have a maximum outer diameter 22 of between 1.4 millimeters and 1.8 millimeters, such as between 1.5 millimeters and 1.7 millimeters, such as approximately 1.6 millimeters. Additionally or alternatively, buffer tube 20 may have a maximum thickness 24 of between 0.4 millimeters and 0.8 millimeters, such as between 0.5 millimeters and 0.7 millimeters, such as approximately 0.6 millimeters. However, it should be understood that the present disclosure is not limited to such ranges, and rather than suitable buffer tubes 20 having other suitable diameters and/or thicknesses are within the scope and spirit of the present disclosure.

One or more optical fibers 30 may be disposed within the buffer tube 20. Each optical fiber 30 may generally include a core 32 and one or more cladding and coating layers 34, as is generally understood. Any suitable optical fiber types may be utilized in accordance with the present disclosure, including for example single-mode or multi-mode optical fibers.

Cable 10 may further include a strength member 40. In exemplary embodiments, the strength member 40 is a yarn, although in alternative embodiments the strength member 40 may be a cord or a composite component. Strength member 40 may, in exemplary embodiments, be formed from aramid fibers or from a fiber-reinforced polymer. For example, the fiber-reinforced polymer may be a glass-fiber reinforced polymer (i.e. fiberglass).

Strength member 40 may have a maximum outer diameter 42. In exemplary embodiments, the maximum outer diameter 42 is less than the maximum outer diameter 22, such that the maximum outer diameter 22 is greater than the maximum outer diameter 42.

As shown, when formed into the cable 10, the strength member 40 may extend generally along a longitudinal axis 12, such as of the cable 10. The strength member 40 may thus extend in a generally linear, non-helical manner. In embodiments wherein the cable 10 includes an outer jacket, as discussed herein, the strength member 40 may thus extend generally longitudinally along the longitudinal axis 10 within the outer jacket. Further, the buffer tube 20 may wrap helically about the strength member 40. Buffer tube 20 may thus extend in a helical, non-linear fashion along, for example, longitudinal axis 12. Buffer tube 20 may contact the strength member 40, and the buffer tube 20 and strength member 40 may be bound together.

Further, in exemplary embodiments, the buffer tube 20 may have a stiffness and a tension. The strength member 40 may also have a stiffness and a tension. In exemplary embodiments, at least one of the stiffness or the tension of the strength member 40 is greater than the respective one of the stiffness or the tension of the buffer tube 20. For example, in exemplary embodiments, the tension of the strength member 40 is greater than the tension of the buffer tube 20. Additionally or alternatively, the stiffness of the strength member 40 is greater than the stiffness of the buffer tube 20.

Cable 10 may further include an outer jacket 50 which surrounds the buffer tube 20 and strength member 40. Outer jacket 50 may define an interior 52 in which buffer tube 20 and strength member 40 are disposed. In some embodiments, outer jacket 50 may contact the buffer tube 20 and/or strength member 40, while in other embodiments the outer jacket 40 may be spaced from the buffer tube 20 and/or strength member 40. Outer jacket 50 may include an outer surface 54 which is the outermost exterior surface of the cable 10. In exemplary embodiments, a cross-sectional profile of the outer jacket 50 may be circular.

Outer jacket 50 may be formed from a suitable polymer, such as suitable thermoplastic. For example, in some embodiments, outer jacket 50 may be formed from a polyolefin, such as in exemplary embodiments a polyethylene. Alternatively, however, other suitable materials may be utilized.

Outer jacket 50 may have a maximum outer diameter 56 of less than or equal to 12 millimeters, such as less than or equal to 11 millimeters, such as less than or equal to 10 millimeters, such as between 8 millimeters and 12 millimeters, such as between 9 millimeters and 11 millimeters, such as approximately 10 millimeters.

In some embodiments, cable 10 may additionally include a plurality of strength elements 60, such as for example aramid fibers. The strength elements 60 may surround the buffer tube 20 and/or strength member 40, and may be disposed within the outer jacket 50.

Figure 3:
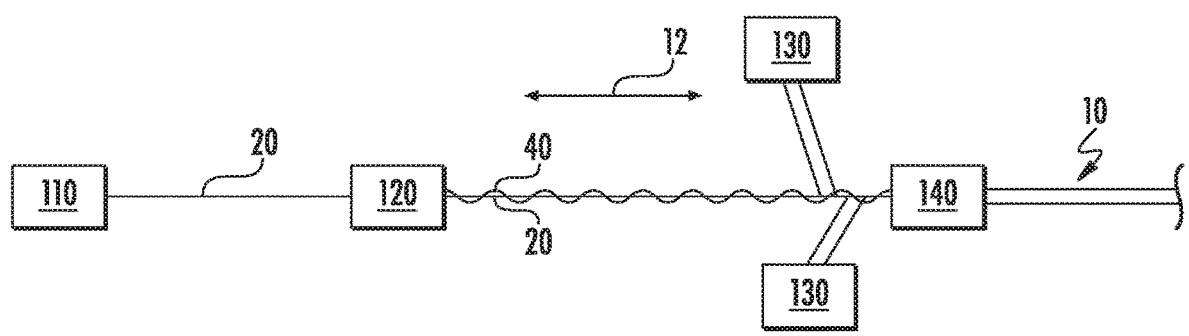
FIG. 3 is a schematic illustration of a method for forming a fiber optic cable in accordance with embodiments of the present disclosure.

Referring still to FIGS. 1 and 2 as well as to FIG. 3, the present disclosure is further directed to methods for forming fiber optic cables 10. A method may include, for example, paying off a buffer tube 20 such that the buffer tube 20 extends generally along a longitudinal axis 12. When the buffer tube 20 is paid off and extends generally along such longitudinal axis 12, the buffer tube 20 is thus extending in a generally non-helical manner. The buffer tube 20 may, for example, be payed off from a reel 110, or directly from an upstream step in the cable forming process. In exemplary embodiments, the one or more optical fibers 30 are disposed within the payed off buffer tube 20.

A method may further include, for example, binding the buffer tube 20 (which is extending generally along the longitudinal axis 12 as discussed) with a strength member 40. Such binding may occur, for example, via use of a binding head 120. In this manner, the strength member 40 may be in contact with the buffer tube 20 and wrapped helically around the buffer tube 20.

The strength member 40 which is bound to the buffer tube 20 may have at least one of a tension or a stiffness that is greater than a respective tension or stiffness of the buffer tube 20, as discussed herein. The greater tension and/or stiffness may advantageously cause movement of the buffer tube 20 and strength member 40 after and due to such binding. The advantageous result of such movement is that the strength member 40 may extend generally along the longitudinal axis 12, as discussed herein, while the buffer tube 20 wraps helically around the strength member 40. Accordingly, when such method is utilized, the resulting cable 10 advantageously includes the strength member 40 extending generally along the longitudinal axis 12 and the buffer tube 20 wrapping helically around the strength member 40.

Notably, in exemplary embodiments, the relative tensions are maintained in the resulting cable 10.

A method may further include, for example, surrounding the buffer tube 20 and strength member 40 with a plurality of strength elements 60. The strength elements 60 may, for example, be paid off from fiber reels 130 or other suitable supply locations. In exemplary embodiments, such step may occur after the binding step.

A method may, in some embodiments, further include jacketing the buffer tube 20 and the strength member 40, as well as in exemplary embodiments the strength elements 60, such that an outer jacket 50 surrounds the buffer tube and strength member 40, as well as in exemplary embodiments the strength elements 60. Such step may occur, for example, after the binding step as well as, in exemplary embodiments, after the surrounding step. A jacketing apparatus 140, which may for example include an extruder and other suitable devices for facilitating jacketing, may be utilized.

In exemplary embodiments, the paying off, binding, surrounding, and/or jacketing steps are performed in a continuous in-line process, with no take-up of the cable components between steps. Alternatively, however, take-up may be utilized as necessary between certain steps, such after binding and before surrounding and/or jacketing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a fiber optic cable, the method comprising:
   paying off a buffer tube such that the buffer tube extends generally along a longitudinal axis; and
   binding the buffer tube with a strength member, the strength member being wrapped helically around the buffer tube, the strength member having at least one of a tension or a stiffness that is greater than a respective tension or stiffness of the buffer tube,
   wherein the resulting fiber optic cable comprises the strength member extending along a longitudinal axis and the buffer tube wrapping helically about the strength member.

2. The method of claim 1, wherein at least one optical fiber is included in the payed off buffer tube.

3. The method of claim 1, wherein the strength member is formed from one of aramid fibers or fiberglass.

4. The method of claim 1, wherein the strength member is a yarn.

5. The method of claim 1, wherein the tension of the strength member is greater than the respective tension of the buffer tube.

6. The method of claim 1, wherein the buffer tube is formed from a polyester.

7. The method of claim 1, wherein the buffer tube is formed from a polybutylene terephthalate.

8. The method of claim 1, wherein the buffer tube is formed from a polypropylene.

9. The method of claim 1, wherein an outer diameter of the buffer tube is greater than an outer diameter of the strength member.

10. The method of claim 1, further comprising jacketing the buffer tube and strength member such that an outer jacket surrounds the buffer tube and strength member.

11. The method of claim 10, wherein the paying off, binding, and jacketing steps are performed in-line.

12. The method of claim 1, further comprising surrounding the buffer tube and strength member with a plurality of strength elements.

* * * * *